United States Patent [19]
Hamamoto

[11] Patent Number: 5,684,558
[45] Date of Patent: Nov. 4, 1997

[54] SEMI-RIMLESS SPECTACLES

[75] Inventor: Hidesuke Hamamoto, Sabae, Japan

[73] Assignee: Hamamoto Technical Co., Ltd., Sabae, Japan

[21] Appl. No.: 687,678

[22] Filed: Jul. 26, 1996

[30] Foreign Application Priority Data

Sep. 6, 1995 [JP] Japan .................... 7-009458

[51] Int. Cl.⁶ .................. G02C 1/04; G02C 1/00; G02C 5/00
[52] U.S. Cl. .................. 351/106; 351/86; 351/154
[58] Field of Search .................. 351/83, 86, 85, 351/103, 106, 150, 151, 154

[56] References Cited

U.S. PATENT DOCUMENTS 4,842,399   6/1989   Tsai .................... 351/106

FOREIGN PATENT DOCUMENTS 2701573   8/1994   France .................... 351/106

Primary Examiner—Huy Mai
Attorney, Agent, or Firm—Ronald R. Snider

[57] ABSTRACT

The present invention aims to provide semi-rimless spectacles in which drop and break of a retaining cord suspending a lense are prevented in simple and proper manners and also the simple construction is disclosed therein to assemble the spectacles with easy manual works in the efficient manners. In order to attain this object, the following construction is adopted. The cord ditch is formed in the inner surface of brow material toward its tip end area, while an upper aperture and a lower aperture are drilled through in the cord ditch. The cord end runs through the upper aperture from the inside to the outside and turns through the lower aperure to the inside and then folds back downward to the tip end of the brow material in the cord ditch, while the lens suspension loop portion of the cord running from the cord end is partly inserted into the ditch together with the cord end portion when the lens is fitted into the cord and the brow material. Thus, the tight piling of the two cords provides sturdy coupling of the retaining cord in durable manners.

7 Claims, 3 Drawing Sheets

SEMI-RIMLESS SPECTACLES

BACKGROUND OF THE INVENTION

This invention relates to the improvement for semi-rimless spectacles which have a retaining cord on each tip end of a browbar or a rimbar, the cord holding to suspend a lense, and thus the invention aims to provide the semi-rimless spectacles to prevent the cord from breaking suddenly during use or to prevent the cord from falling off.

The present invention has an object to provide simple construction to assemble the spectacles in manual works which realize the fitting of the lense in assured and efficient conditions, and thus the present invention can provide the semi-rimless spectacles in the reliable manners to hold the lense properly.

In the primary stage, the spectacles were mainly developed to correct human sightness, but in the present days, it has been required to produce various kinds of the spectacles which satisfy people's requirements, such as wide range of vision, light weight, smart appearance, equipped with high fashion sense. In order to meet such requirements, semi-rimless spectacles or rimless spectacles are now very popular among people. With regard to the rimless spectacles, a pair of lenses is directly held by a bridge part and a temple joint part. This spectacles, therefore, have some merits that people can select the size or shape of lense in free manners and also the spectacles may have wider visions thereof, but on the other hand, the spectacles are found with some unsatisfacory points. As their lense circumferences are all exposed, it is difficult to put some decorative accessories thereupon, and in order to connect the lense, bolts and nuts are unavoidably used for the connecting portions which are very shapeless and disturb wearer's vision badly. Moreover, said connecting portions tend to be cracked or to be loosened easily.

In view of these inconveniences, the recent wearers tend to favor semi-spectacles which has almost the same structural stability as that of ordinary full-rim spectacles rather than rimless spectacles, because decorative accesories can be arranged on the semi-rim portions and locking portions are cleared of the lens surface.

For the semi-rimless spectacles, in order to hold the lense, a retaining cord produced by plastic fiber like nyron is adopted, and the cord is suspended from each tip end of a browbar or rimbar, while a ditch is drilled in the circumferential surface of the lense, and then the cord is tightly inserted into the ditch. Then, the lense is fitted with the browbar or rimbar, whereon a front frame is established. In this case, in the prior art, as shown in FIG. 8, an end (31') of a cord (3') runs from inside of a browbar(2') through a lower aperture (23') which locates in the vicinity of a tip end (21') of the browbar (2'), and then the cord runs from outside of the browbar (2') through an upper aperture (22'). The cord (3') constitutes a lens suspension loop portion (32') to suspend the lense. Although the cord (3') meets some frictional power through its meander between the upper aperture (22') and the lower aperture (23'), it extends straightly in fundamental construction so that the cord end (31') sometimes tends to fall off because of load increase or vibration of the lense during use. Especially, considerable tension power toward downward is caused upon the loop portion (32'), and when the lense is somehow vibrated in the vicinity of the lower aperture (23') adjacent to the tip end (21'), the cord (3') may vibrate synchronously, whereas the cord (3') is rubbed against the edge portion of the lower aperture (23') by the vibration under said tension power and finally the cord (3') becomes cut out so that the lense suspended by the cord accidentally falls down. This kind of accidents shall be caused also by the temparature change, for example, rapid descent of tempature, and by hysterisis of the cord itself.

When the cord is fallen off or cut out, the lense is natually fallen down, which invites not only the breakage of precious lense but also the danger for the wearer. It is unpredictable when and where an accident like this might happen to the wearers. For instance, in case if the wearer meets such accident on wheels, it may cause some big traffic accident. Therefore, with regard to this kind of semi-rimless spectacles, the dealer warns the user in advance to check constantly the situations of the spectacles and advises to change the relative cord once a half year. However, it is very troublesome for the wearer to always attend to the situations of his own spectacles, therefore, it is a burden for him both in mentality and economy to take care of the same. Accordingly, in this present status, such warning or advice shall not be observed properly among the wearers.

Under the circumstances mentined above, it is an absolute duty for spectacles dealers to avoid the falling off of the lense at the minimum degree, so that the dealers may contribute themselves to public and social welfare.

SUMMARY OF THE INVENTION

In deep consideration of the explained problems, this invention has an object to provide reliable semi-rimless spectacles which avoid sudden drop and sudden break of a retaining cord and which can be also assembled in simple manual works for the fitting of a lense in ensured and efficient manners.

The present invention has adopted following construction, where a cord ditch for folding a retaining cord is formed along the inner surface of a tip end area of a browbar or rimbar to suspend said cord. Hereinafter said browbar and rimbar are referred generically as "Brow material". An upper aperture and lower aperture through which the cord runs are established in the cord ditch. The end of the cord is now inserted into the upper aperture from the inner surface of the brow material, and then the cord end is inserted into the lower aperture from the outside surface and extends in the cord ditch. During this process, one portion of the cord laps over said cord end extending in said cord ditch while the other portion thereof constitutes a lens suspension loop portion to suspend a lens. Then, the latter portion is fitted into the groove provided around the circumferential surface of the lens while the upper part of the lens is fitted into the brow material, so that said cord end is pressed with the circumferential surface of the lens through the former portion of the cord. In other words, two cords are piled up one above another along the cord ditch, and there said one portion of the cord is constantly pressing the cord end portion in tight situations.

To make further comments on the above-mentioned structural elements of the present spectacles, the brow material includes a browbar and a rimbar. Both of them, composed of a pair, are necessary elements to consitute a front frame of spectacles. This pair is connected by a central bridge in symmetry, and at the outer end, namely at the both ends of the front frame, a temple is coupled with a hinge joint. In this specification, the word of "Browbar" means the brow material with which some accessories can be decorated, while the word of "Rimbar" means the brow material which has only a function to suspend the lense and the decorations are added with an extra top rim coverd with the rimbar.

This invention adopts, for instance, as the material of a retaining cord, nylon fiber, polyimide fiber, or polyethylene-terephthalate fiber, with a diameter of 1-3 mm.

DESCRIPTION OF THE PREFERRED EMBODIMENT

The preferred embodiment is now explained according to FIG. 1–FIG. 5.

Figure 1:
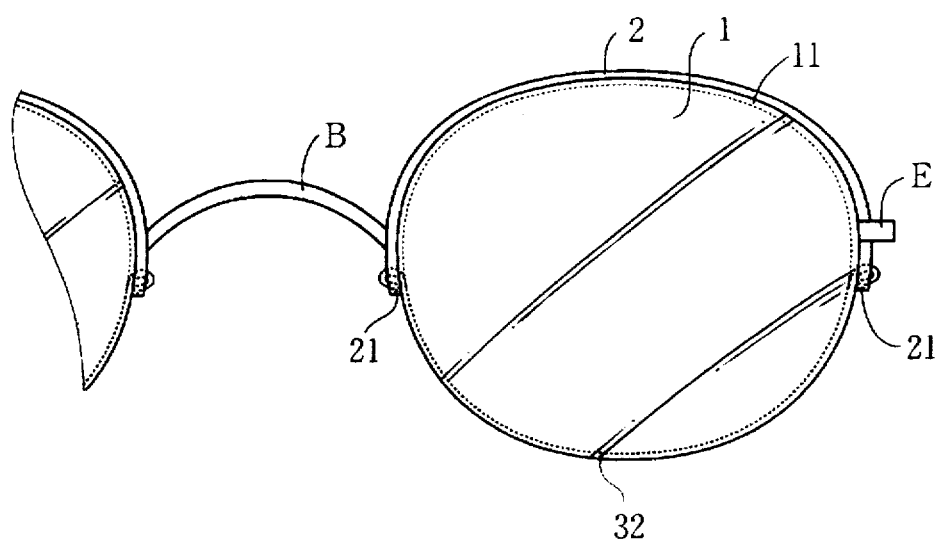
FIG. 1 is a front view of semi-rimless spectacles showing an embodiment of the present invention.

With reference to FIG. 1, the numeral 1 indicates a pair of lense, and a ditch (11) is drilled on the circumferential surface of the lense (1) which is expressed with a dotted line in the drawing, and this ditch has a fixed width and a fixed depth. Into an upper portion of the ditch (11), a convex wire made of cushion material (not shown on the drawing) to be fixed between the lens and brow material (2) is fitted therein, while into a lower portion of the ditch (11), a retaining cord (3) explained in a later stage is inserted, and thus the lense (1) is properly suspended with the brow material (2).

Figure 3:
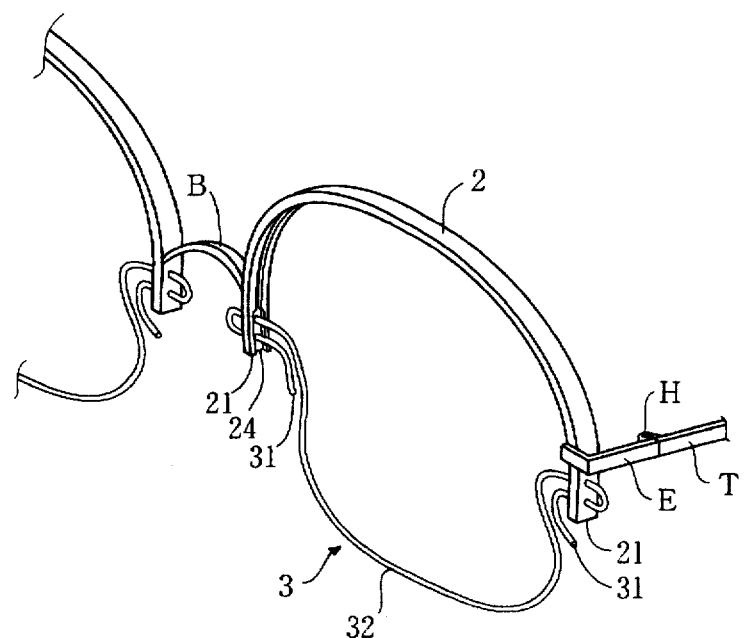
FIG. 3 is a perspective view showing how to insert the cord.

The numeral 2 shows the brow material which is located over the upper bow portion of the lense (1), and according to FIG. 1, the brow material is a browbar. This brow material (2) is made of solid eighteen carat gold. As shown in FIG. 3, the brow material (2) is composed of a pair in symmetry, and a bridge (B) is welded to the center of the brow material (2). On both outer ends of the brow material (2), hinge joints (E) are connected, and a temple (T) is also coupled with the joint (E) by a hinge (H).

The numeral 3 indicates a retaining cord which suspends the lower bow portion of the lense (1), the cord is made of NYLON 6 in filament status with diameter of 1 mm.

Figure 7:
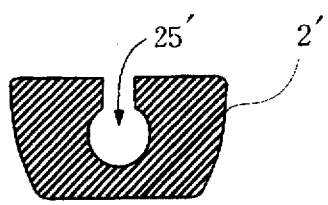
FIG. 7 is a fragmenary end view along the line Y—Y of FIG. 6.

In the vicinity of a tip end (21) of the brow material (2), two apertures are drilled through, and these apertures are an upper aperture (22) and a lower aperture (23) respectively, and they are aligned high and low. In the inner surface of the brow material (2), a cord ditch (24) to accept the cord (3) is established from a little higher portion of the upper aperture (22) to the tip end (21), and the width of the ditch (24) is twice the cord size while the depth is almost the same with the cord size. At the same time, in the inner surface of the brow material (2) excluding said cord ditch (24), a insertion cushion ditch (25') in Ω-shape is formed, having a narrower opening and a wider inner room, into which a cushion material(not shown in the drawing) is fitted. The shape of this insertion cushion ditch (25') can be referred with FIG. 7.

Figure 4:
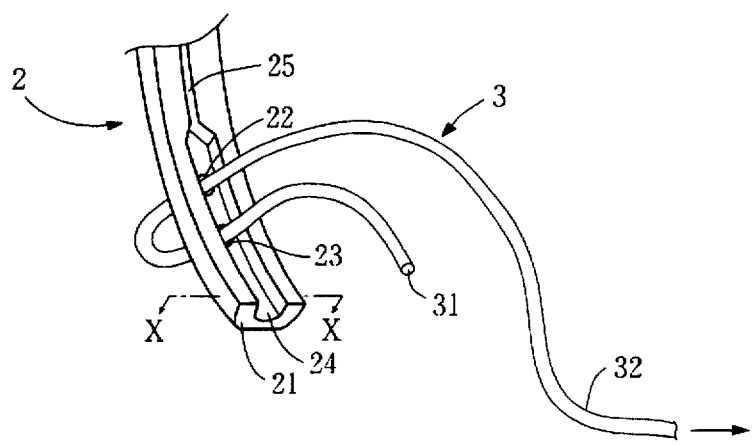
FIG. 4 is an enlarged perspective view explaining in details how to insert the cord according to the above FIG. 3.
Figure 5:
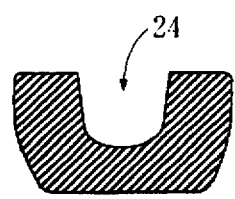
FIG. 5 is a fragmentary end view along the line X—X of FIG. 4.
Figure 6:
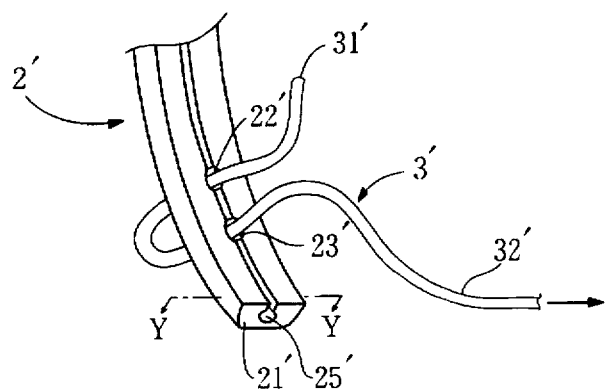
FIG. 6 is an enlarged perspective view explaining how to insert the cord in prior art.

Although FIG. 3 and 4 show that the cord ditch (24) is drilled from a little bit higher portion of the upper aperture (22) to the tip end (21), the ditch may be drilled from a portion of the lower aperture (23) to the tip end (21), to the extent that two cords (3) can be properly contained in stable condition.

Although FIG. 4 shows that the width of the cord ditch (24) is drilled at about two times of the cord size, this invention is not always limited to this measurement. For instance, the width is decided at almost the same size of the cord, while the depth of the cord ditch is decided at about two times of the cord size.

Now, the procedures to run the cord (3) are explained. With reference to FIG. 3 and FIG. 4, the end (31) of the cord (3) runs through the upper aperture (22) from the inner surface of the brow material (2) to the outer surface, and then the end (31) turns through the lower aperture (23) from the outer surface to the inner surface. The end (31) is now folded back downward along the ditch cord (24) while a lens suspension loop portion (32) of the cord (3) partly laps over said cord end (31) extending in the cord ditch (24). Then, the loop portion (32) fits into the ditch (11) of the lens (1) so as to suspend the lens (1). Thus, the cord end (31) and one part of the loop portion (32) are contained tightly in the cord ditch (24). When the brow material (2) is fitted into the ditch (11) drilled at the upper bow portion of the lense(1) with the cushion material(not shown), the front frame of the present semi-rimless spectacles is now completed as shown in FIG. 1.

Figure 2:
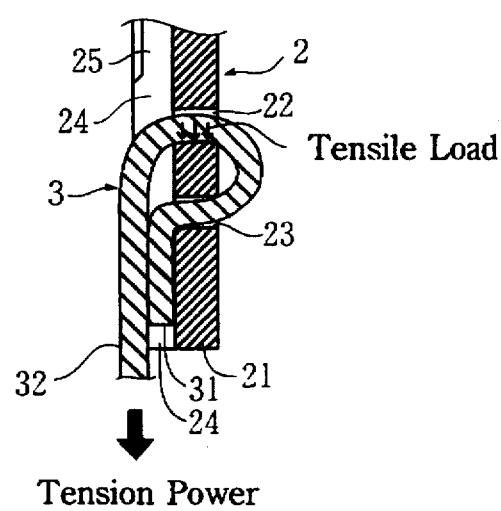
FIG. 2 is a longitudinal sectional view showing setting condition of a retaining cord in the vicinity of a tip end of brow material.

The method to adopt the present cord suspension is almost contrary to that of prior art adopted in semi-rimless spectacles. By this adoption, as shown in FIG. 2, tensile load caused by the cord (3) operation is averagely dispersed downward on the surface of the aperture(22), and the loop portion (32) partly extending over the ditch presses tightly the cord end portion (31). In other words, the cord end (31) runs through both apertures (22,23) and then it is folded back downward along the cord ditch (24) while pressed by the loop portion (32) extending over the ditch (24) by face to face when the lense (1) is properly suspended by the loop portion (32). Accordingly, when the lense (1) is set in tensional situation, the cord end (31) area flatly contacts over the inner surface of the ditch (24) located below the upper aperture (22) by face to face, and therefore the tensile load is burdened on the vicinity of the code end (31) area.

Based on this fact, compared with semi-rimless spectacles developed by prior art where concentrated tensile load and vibrating friction are unavoidable, the semi-rimless spectacles developed by the present invention manage to eliminate such inconveniences, and finally this invention has realized to avoid the cord break invited thereby.

Figure 8:
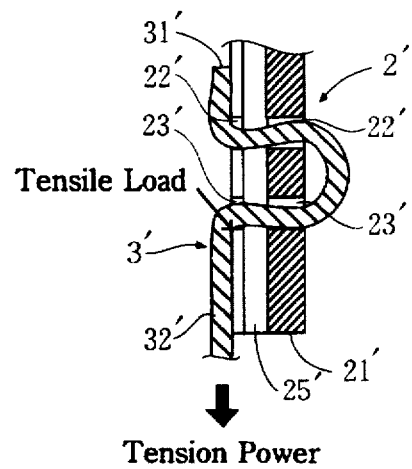
FIG. 8 is a longitudinal sectional view showing setting condition of the cord in the vicinity of the tip end of brow material in prior art.

Through a field test to check the break condition of the cord, of course, using the cord with the same material as adopted in the present invention, it is now proved that the specimen equipped with the present construction shows about 1.5 times durability better than that equipped with prior art shown in FIG. 8, in other words, the value of tensile strength is now increased from 3.3 Kgs into 4.8 Kgs.

Although the invention has been described in its preferred form with a certain degree of particularity, it should be understood that the present disclosure of the preferred form may be changed in the details of construction and the combination and arrangement of parts may be resorted to without departing from the spirit and the scope of the invention as hereinafter claimed. For example, with regard to the cord ditch (24), it can be established in the various sizes or forms in case if the cord (3) can be stored in piled manners, such as preparing knurls or convex/concave portions in the cord ditch.

As the present invention has been explained in its preferred embodiment, only simple constructions, such as forming a cord ditch along in the inner surface of a tip end area of brow material and as establishing an upper aperture and a lower aperture along the cord ditch, can prevent a lense from fallin off through the increase of durability power on the cord suspension. In addition, the assembly of spectacles can be attained by easy hand work with efficiency to suspend the required lense.

This invention contributes not only to general safety for a user wearing semi-rimless spectacles but also to practical and econimical merits together under inexpensive costs, which benefits industrial applicability.

What is claimed is:

1. Semi-rimless spectacles comprising:

a cord ditch formed on an inner surface of both tip end areas of brow material which to suspend a retaining cord;

an upper aperture and a lower aperture longitudinally provided in series along said cord ditch;

a lens retaining cord running through said upper and lower apertures and having a lens suspension loop portion to suspend a lens, wherein an end of said retaining cord runs through said upper aperture from an inner surface of said cord ditch towards an outer surface of said brow material and then turns to run through said lower aperture from the outer surface of said brow material and extends towards the underside of said cord ditch, and said retaining cord partly laps over the end thereof in said cord ditch and runs towards said loop portion and a pair of lenses held with said retaining cord and fitted into the inner surface of said brow material, wherein said lenses press said retaining cord extending in said cord ditch so that the end of said cord is securely held in check.

2. Semi-rimless spectacles according to claim 1, wherein the cord ditch is formed in the inner surface of the brow material starting from the upper aperture and ending at the tip end.

3. Semi-rimless spectacles according to claim 1, wherein the cord ditch is formed in the inner surface of the brow material starting from the lower aperture and ending at the tip end.

4. Semi-rimless spectacles according to claim 1, wherein the width of the cord ditch is formed with two times at the size of the retaining cord.

5. Semi-rimless spectacles according to claim 1, wherein the width of the cord ditch is formed with the same at the size of the retaining cord while the depth of the ditch is formed with two times at the size of the cord.

6. Semi-rimless spectacles according to claim 1, wherein the brow material is composed of a browbar.

7. Semi-rimless spectacles according to claim 1, wherein the brow material is composed of a rimbar.

* * * * *